US012792540B1

(12) United States Patent
Roberman et al.

(10) Patent No.: US 12,792,540 B1
(45) Date of Patent: Nov. 10, 2026

(54) METHOD AND SYSTEM FOR MANAGING DATA TRANSFER VIA DIRECT MEMORY ACCESS PROTOCOLS

(71) Applicant: NEXT SILICON LTD., Givatayim (IL)

(72) Inventors: Olga Roberman, Hod Hasharon (IL); Alexander Margolin, Ashdod (IL); Menashe Daskal, Haifa (IL)

(73) Assignee: NEXT SILICON LTD., Givatayim (IL)

( * ) Notice: Subject to any disclaimer, the term of this patent is extended or adjusted under 35 U.S.C. 154(b) by 0 days.

(21) Appl. No.: 19/272,074

(22) Filed: Jul. 17, 2025

(51) Int. Cl.
*G06F 13/28* (2006.01)
*G06F 9/48* (2006.01)

(52) U.S. Cl.
CPC ............ *G06F 13/28* (2013.01); *G06F 9/4881* (2013.01)

(58) Field of Classification Search
CPC ............................... G06F 13/28; G06F 9/4881
See application file for complete search history.

(56) References Cited

U.S. PATENT DOCUMENTS 7,831,745 B1 * 11/2010 Eiriksson ................ G06F 13/28 710/22
8,510,491 B1 * 8/2013 Hendel ............. G06F 15/17331 709/215
8,904,064 B2 * 12/2014 Bellows .................. G06F 13/28 710/52
12,561,261 B1 * 2/2026 Brueggen ............... G06F 13/28
2005/0120146 A1 * 6/2005 Chen ....................... G06F 13/28 710/22
2009/0067431 A1 * 3/2009 Huang .................. H04L 49/901 370/394
2020/0073816 A1 * 3/2020 Blaner .................. G06F 12/023
2020/0334195 A1 * 10/2020 Chen ....................... H04L 69/14
(Continued)

OTHER PUBLICATIONS

P. Huang, X. Zhang, Z. Chen, C. Liu, and G. Chen. 2024. LEFT: LightwEight and FasT packet Reordering for RDMA. In Proceedings of the 8th Asia-Pacific Workshop on Networking (APNet '24). Association for Computing Machinery, New York, NY, USA, 67-73. https://doi.org/10.1145/3663408.3663418.

*Primary Examiner* — Henry Tsai
*Assistant Examiner* — Aurangzeb Hassan
(74) *Attorney, Agent, or Firm* — The Roy Gross Law Firm, LLC; Roy D. Gross

(57) ABSTRACT

The present disclosure provides a system for managing data transfer via a memory access protocol. The system comprises one or more receiving entities, each associated with at least one respective memory element, and one or more hardware-implemented transaction managers. At least one transaction manager is allocatable to manage a specific connection between at least one transmitting entity and a specific receiving entity by obtaining a data transaction comprising a series of data packets via the memory access protocol, wherein the data transaction originates from the at least one transmitting entity and targets a memory element of the specific receiving entity. For each data packet, the transaction manager calculates a corresponding target address in the target memory element based on a sequence number of the data packet, and writes the data packet into the corresponding target address at its order of arrival, thereby facilitating out-of-order packet offloading.

16 Claims, 6 Drawing Sheets

(56) References Cited

U.S. PATENT DOCUMENTS

| | | | | |
|---|---|---|---|---|
| 2023/0388251 | A1* | 11/2023 | Schubert | H04L 47/30 |
| 2024/0080379 | A1* | 3/2024 | Friedman | H04L 69/22 |
| 2024/0143527 | A1* | 5/2024 | Marcovitch | G06F 13/28 |
| 2024/0143539 | A1* | 5/2024 | Marcovitch | G06F 3/061 |
| 2025/0240185 | A1* | 7/2025 | Marcovitch | H04L 12/4633 |
| 2026/0030174 | A1* | 1/2026 | Menon | G06F 9/544 |

* cited by examiner

METHOD AND SYSTEM FOR MANAGING DATA TRANSFER VIA DIRECT MEMORY ACCESS PROTOCOLS

FIELD OF INVENTION

The present disclosure relates to hardware offloading of networking protocols, and more particularly to a hardware-based offloading of data transfer via direct memory access protocols.

BACKGROUND

Packet disorder is a common occurrence in data transmission across communication networks. It refers to the phenomenon where data packets arrive at their destination in a different order than they were originally sent. This can happen due to various factors such as network congestion, varying transmission routes, or differences in packet processing times. For example, in a file transfer application, packets containing later portions of the file might arrive before packets containing earlier portions, potentially causing issues with data reconstruction if not properly reordered.

Reordering data packets is often necessary in communication networks to maintain data integrity and ensure optimal application performance. When packets arrive out of sequence, it can lead to errors in data interpretation, reduced efficiency, and degraded user experience. Therefore, mechanisms to handle packet reordering are typically implemented in network protocols and communication systems.

Traditionally, on-chip Direct Memory Access (DMA) protocols have not implemented packet reordering functionality. This design choice was based on two main factors. First, there was a perceived lack of need for reordering inter-chip communication, which was generally considered deterministic. Second, implementing reordering functionality in hardware was associated with significant overhead requirements, which were deemed unnecessary for on-chip communication.

However, modern chip design has undergone a technological shift towards highly configurable logic. This approach is implemented through re-allocatable processing elements, allowing for greater flexibility and efficiency in chip operations. As a result, chips can now be dynamically reconfigured to perform various tasks, leading to increased parallelization and complexity in data processing.

This shift in chip architecture has led to a reemerging need for efficient packet reordering mechanisms. The high level of parallelization among data threads in modern chip designs creates scenarios where packets from different processing elements may arrive out of order, even within the same chip. Consequently, there is a renewed need for efficient, reconfigurable mechanisms for packet reordering that can adapt to the dynamic nature of modern chip designs.

Recent advancements in data center networks have introduced multi-path transmission techniques to improve bandwidth utilization in Remote Direct Memory Access (RDMA) systems. These techniques often result in out-of-order packet delivery, which can negatively impact the performance of RDMA Network Interface Cards (RNICs). To address this challenge, various packet reordering solutions have been proposed. These solutions typically employ bitmap-based schemes to track packet order and implement packet gathering techniques to manage out-of-order arrivals. While these approaches have shown improvements in throughput and reduced flow completion times, they often require significant on-chip memory resources and may struggle to maintain performance under high-speed conditions.

SUMMARY OF THE INVENTION

Embodiments of the invention may include a method and a system (e.g., an integrated circuit device) for managing data transfer via a memory access protocol (e.g., DMA, RDMA and the like).

Embodiments of the invention may facilitate direct writing of out-of-order packets. The system may write data packets into their calculated target addresses in the order of arrival, even if received out of sequence. This approach may differ from traditional reordering techniques, potentially reducing processing overhead and latency. By enabling immediate writing of packets as they arrive, the system may achieve faster data processing and improved overall performance in high-speed networking environments.

The invention may employ hardware-implemented transaction managers. These dedicated hardware components may be dynamically allocated to manage specific connections. This approach may offer advantages over software-based or fixed hardware solutions, potentially providing higher processing speeds and more efficient resource utilization. The use of hardware-implemented managers may enable embodiments of the system to effectively handle high-speed data transfers.

Embodiments may include dynamic allocation and deallocation of transaction managers. Transaction managers may be temporarily allocated to serve specific connections and deallocated upon completion. This dynamic resource management may allow efficient use of system resources, potentially improving scalability and adaptability to varying network conditions.

Embodiments of the invention may implement a state machine-based workflow in the transaction managers. This workflow may be based on packet metadata indicating whether a packet is at the start, middle, or end of a transaction. Such an approach may enable more efficient packet processing by respective transaction managers, potentially reducing processing time and improving system responsiveness.

Embodiments may maintain a comprehensive transaction context. This context may include current state, base memory address, and expected packet sequence numbers. By maintaining this detailed context, the system may achieve more accurate and efficient packet processing, potentially reducing errors and improving overall data integrity.

Embodiments of the invention may integrate task management and data transfer, which may be particularly useful for implementation in reconfigurable systems and chips. For example, embodiments may divide processing tasks into parallel data threads, allocate processing elements to implement each thread, and manage data transfer between these elements using the same transaction management system. This integrated approach may enable efficient and dynamic resource utilization and streamlined data processing.

Embodiments of the invention may offer a flexible system architecture. Embodiments may be implemented by either a single platform (e.g., an integrated circuit) or as separate transmitting and receiving entities. This versatility may allow for adaptable deployment across various hardware configurations and network topologies.

Embodiments of the system may include one or more receiving entities, each associated with at least one respective memory element, and one or more hardware-implemented transaction managers. At least one transaction manager may be allocatable to manage a specific, ad-hoc connection between at least one transmitting entity and a specific receiving entity of the one or more receiving entities.

For example, embodiments of the system may be implemented by a reconfigurable integrated circuit (IC) device. In such embodiments, the IC device may include the one or more hardware-implemented transaction managers, and may further include (a) one or more processing elements (PEs), implementing the at least one transmitting entity, (b) one or more PEs implementing the one or more receiving entities.

The IC device may further include one or more reconfigurable on-chip communication lines or networks, also referred to herein as connections, which may implement ad-hoc Direct Memory Access (DMA) communication between memory elements of the transmitting and receiving entities. The term ad-hoc may be used in this context to indicate a connection that may be implemented for a specific configuration, or function of PEs in the IC device.

In such embodiments, at least one transaction manager may be allocated, (e.g., by a task manager module or configuration module), as an ad-hoc handler of a specific connection. In other words, at least one transaction manager may be allocated to serve a specific, ad-hoc connection between at least one transmitting entity and a specific receiving entity of the one or more receiving entities.

In another example, embodiments of the system may be implemented by a distributed configuration, where the at least one transmitting entity may be implemented by at least one first computing device, while the one or more receiving entities and the hardware-implemented transaction manager (s) may be implemented by at least one second, separate computing device. The at least one first computing device and the at least one second computing device may be connected by a communication line or network, configured to facilitate DMA or Remote Direct Memory Access (RDMA) communication between memory devices of the first and second computing devices.

In some embodiments, the at least one transaction manager may be configured to obtain a data transaction, including a series of (e.g., one or more) data packets via the direct memory access connection. The data transaction may originate from the at least one transmitting entity and may target a memory element of the specific receiving entity. It may be appreciated that as embodiments of the invention may include communication via a direct memory access protocol, the term receiving entity may be expanded to relate to the target memory elements or devices, according to context.

The transaction manager may be further configured to, for each data packet, calculate a corresponding target address in the target memory element based, for example on a sequence number of the data packet, and write the data packet into the corresponding target address at its order of arrival, thereby facilitating out-of-order packet offloading.

For example, the received series of data packets may include one or more data packets that are placed out of order (e.g., when a first packet having a first serial number precedes a second packet having a second, smaller serial number). The transaction manager may be configured to write the data packets of the data transaction into their corresponding, calculated target addresses substantially upon their arrival (e.g., storing the data transaction in its proper ordering).

In some embodiments, the system may further include at least one task manager. The task manager may be configured to temporarily allocate a specific transaction manager of the at least one transaction managers to serve a specific connection, representing a communication link for data transfer between a specific transmitting entity and a specific receiving entity.

Additionally, or alternatively, the at least one transaction manager may be configured to maintain a transaction metadata. The transaction metadata may include, for example, a current state of the data transaction, a base memory address for writing received packets, a range of expected data packet sequence numbers, an identification of at least one transmitting entity, an identification of at least one receiving entity, and the like.

In some embodiments, the at least one transaction manager may be further configured to determine that writing of an expected number of packets into their respective target addresses has been completed, based on the transaction metadata. The transaction manager may consequently signal a completion acknowledgement to a specific transmitting entity upon that completion.

Additionally, or alternatively, the at least one transaction manager may propagate the completion acknowledgement to at least one task manager, which may be configured to deallocate the transaction manager from serving the specific connection upon receiving the completion acknowledgement signal.

In some embodiments, the system may further include a plurality of configurable processing elements, associated with respective memory devices. In such embodiments, the task manager may be further configured to receive a processing task, divide the processing task into a plurality of parallel data threads, and allocate unique groups of the plurality of processing elements to implement each data thread.

In the context of the present invention, the term “thread” may refer to a distinct sequence of programmed instructions, or a data flow, that can be executed independently and concurrently with other threads. Threads may, for example, represent subdivisions of a larger processing task, allowing for parallel execution across multiple processing elements. In some aspects, each thread may operate on its own subset of data, potentially generating data packets that need to be transmitted to other parts of the system.

Each data thread may include, or may be served by a separate transmitting entity (e.g., generating respective data packets for the data transaction) and/or a separate receiving entity (e.g., utilizing respective data packets to further process that thread).

According to some embodiments, the data packets generated from one or more (e.g., two or more) data threads may potentially arrive at the transaction manager out of order. The transaction manager may be configured to receive the potentially out-of-order data packets from the one or more (e.g., two or more) data threads, calculate target addresses for each received data packet (e.g., based on their respective sequence numbers), and write the data packets to their calculated target addresses in the order of arrival (e.g., substantially at the time of their arrival), to facilitate on-the-fly reordering of packets originating from the two or more data threads.

For example, the transaction manager may write data packets from the one or more (e.g., two or more) data threads substantially at their time of arrival (e.g., before a predefined number of additional packets are fully received), thereby offloading the task of packet reordering, on-the-fly (i.e., as the packets arrive).

In some embodiments, the one or more transaction managers may include a plurality of transaction managers. Each transaction manager may be allocatable to handle, or serve a unique, ad-hoc connection between at least one specific transmitting entity and a specific receiving entity of the one or more receiving entities.

Embodiments of the system may further include a packet classification module. The packet classification module may be configured to receive incoming packets pertaining to one or more connections, classify the incoming packets to identify the connection associated with one or more (e.g., each) packet, and route each packet to a transaction manager that is allocated to the identified connection.

It may be appreciated that the data transaction may include potentially concurrent data packets, originating from two or more transmitting entities (e.g., from two or more threads). Embodiments of the system may further include a serialization module adapted to receive the data transaction and serialize the (potentially) concurrent data packets, to produce the series of data packets.

Additionally, or alternatively, embodiments of the system may include a controller or processor, adapted to provide higher-level management capabilities to the direct memory access communication as elaborated herein.

For example, the controller may be configured to detect a condition in which a number of received packets matches an expected number of packets, but a gap occurs in sequence numbers of received packets due to packet duplication. Upon said detection, the controller may, for example, issue a retransmission request for the data transaction to a specific transmitting entity of the one or more transmitting entities.

Embodiments of the invention may further include a method of managing, or handling data transfer. Embodiments of the method may include obtaining, via a memory access protocol, a data transaction that includes a series of data packets. The data transaction may originate from at least one transmitting entity and may target a memory element of a specific receiving entity.

Embodiments of the method may further include allocating a hardware-implemented transaction manager to manage connection between the at least one transmitting entity and the specific receiving entity. For each data packet of the series, the method may include calculating, by the allocated transaction manager, a corresponding target address in the target memory element (e.g., based on a sequence number of the data packet), and writing, by the allocated transaction manager, the data packet into the corresponding target address at its order of arrival, Embodiments of the method may thus facilitate on-the-fly offloading of out-of-order data packet communication.

Embodiments of the invention may further include a reconfigurable Integrated Circuit (IC) device that may include a plurality of Processing Elements (PEs), one or more hardware-implemented transaction managers, and a task manager.

According to some embodiments the task manager may be configured to receive a processing task (e.g., a mathematical function), and divide the processing task between groups of PEs.

For example, processing task may include a series of matrix multiplications, e.g., A×B×C. The task manager may allocate a first group of PEs to perform a first segment, or stage of the task (e.g., A×B=Temp), and allocate a second group of PEs to perform a second, subsequent segment or stage (e.g., Temp×B=Outcome) stage of the task, based on output (Temp) of the first group of PEs.

The task manager may be further configured to allocate or define one or more direct memory access connections, facilitating communication of data transactions between a memory device pertaining to the first group of PEs (as one or more transmitting entities), and a memory device pertaining to the second group of PEs (as a receiving entity).

Pertaining to the example of the matrix multiplication task, the task manager may allocate an online connection (e.g., a wire, a bus, a network) that facilitates direct memory access between a memory device of the first group (e.g., a cache memory, where Temp is stored) and memory device of the second group (e.g., another cache memory, from where Temp may be processed to perform the second multiplication Temp×B=Outcome).

As elaborated herein, the task manager may subsequently allocate at least one ad-hoc transaction manager, to perform on-the-fly packet reordering of out-of order packets in data transactions, between the first group of PEs (e.g., the one or more transmitting entities) and the second group of PEs (e.g., the one or more receiving entities).

Additionally, or alternatively, the task manager may be configured to divide the processing task into a plurality of parallel data threads and allocate unique subsets of the first group of PEs to implement each data thread. The task manager may subsequently define each data thread by a separate transmitting entity, generating respective data packets for the data transaction.

According to some embodiments, the at least one allocated transaction manager may be configured to obtain a data transaction, that includes a series of data packets, via the direct memory access connection. That data transaction may originate from the one or more transmitting entities, and may target a memory element of a specific receiving entity. For one or more (e.g., each) data packet, the allocated transaction manager may (i) calculate a corresponding target address in the target memory element, and (ii) write the data packet into the corresponding target address, substantially at its time of arrival, thereby facilitating out-of-order packet offloading.

Embodiments of the invention may include a method of managing data transfer. The method may involve obtaining a data transaction comprising a series of data packets via a memory access protocol. This data transaction may originate from at least one transmitting entity and target a memory element of a specific receiving entity. The method may include allocating a hardware-implemented transaction manager as an ad-hoc handler to manage the connection between the transmitting and receiving entities. For each data packet, the method may involve calculating a corresponding target address in the target memory element based on the packet's sequence number, and writing the packet into this address at its order of arrival, thereby facilitating out-of-order packet offloading.

According to some embodiments, the data transaction manager may maintain a transaction metadata element. This metadata may include information such as the current state of the data transaction, a base memory address for writing received packets, and a range of expected data packet sequence numbers, and the like. The transaction manager may use this metadata to determine when writing of an expected number of packets has been completed, and subsequently signal a completion acknowledgement to the transmitting entity.

Additionally, or alternatively, embodiments of the method may include deallocating the transaction manager from serving the connection upon completion of writing the expected number of packets. This dynamic allocation and deallocation of resources may allow efficient management of system resources across multiple connections or transactions.

Additionally, or alternatively, embodiments of the method may involve receiving a processing task and dividing it into multiple parallel data threads. Unique groups of processing elements may be allocated to implement each data thread, with each thread potentially serving as a separate transmitting entity generating respective data packets for the data transaction. This approach may enable efficient parallel processing of complex tasks. In cases where data packets from two or more data threads potentially arrive at the transaction manager out of order, embodiments of the method may include receiving these potentially out-of-order packets, calculating target addresses for each based on their sequence numbers, and writing the packets to their calculated target addresses in the order of arrival, to facilitate on-the fly packet reordering.

The foregoing general description of the illustrative embodiments and the following detailed description thereof are merely exemplary aspects of the teachings of this disclosure and are not restrictive.

BRIEF DESCRIPTION OF FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 2A:
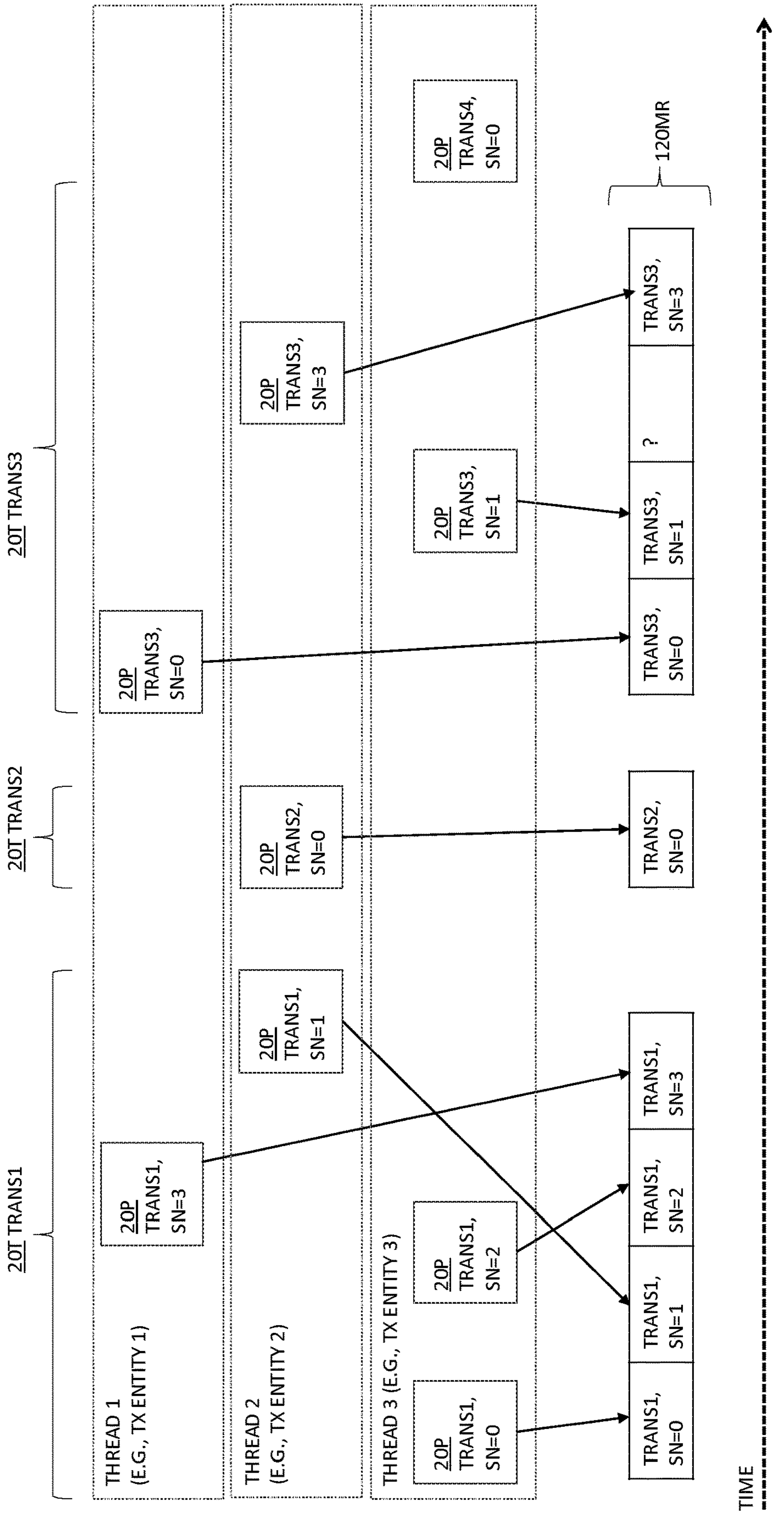
FIG. 2A is a timeline diagram illustrating an example of real-time offloading of packet reordering in a direct memory access protocol, according to some embodiments of the invention.

FIG. 2A illustrates a timeline diagram showing an example for implementing real-time offloading of packet reordering in a DMA or RDMA protocol, as may be implemented by embodiments of the invention. The diagram demonstrates how multiple transactions, each consisting of one or more packets, may be processed by embodiments of the invention.

In the depicted example, a connection is defined between at least one specific transmitting entity and a specific receiving entity. The transmitting entities (entities 1-3) may correspond to separate, parallel processing threads (labeled here as Threads 1, 2, and 3).

The diagram of FIG. 2A shows a first transaction 20T (TRANS1) that consists of four packets 20P, denoted by respective sequence numbers SN=0 through SN=3. These packets are obtained from the transmitting entities (threads) 1-3.

According to some embodiments of the invention, the first packet 20P in a data transaction 20T may have special characteristics that distinguish it from subsequent packets. This first packet 20P, which may be referred to as a "First Transaction packet," may include a special header, containing information for processing the entire transaction. The header of the first packet 20P may include, for example data size information, indicating the overall payload size, or a number of packets 20P of the expected transaction 20T. Additionally, the header of the first packet 20P may contain a virtual address to which the packet data should be copied in the receiving entity's memory 120MR.

According to some embodiments, the first packet 20P in the transaction may be required to be received in-order (e.g., start with sequence number SN=0), to ensure that system 100 has all necessary information to handle the rest of transaction 20T correctly, even if subsequent packets 20P arrive out of order.

Figure 3:
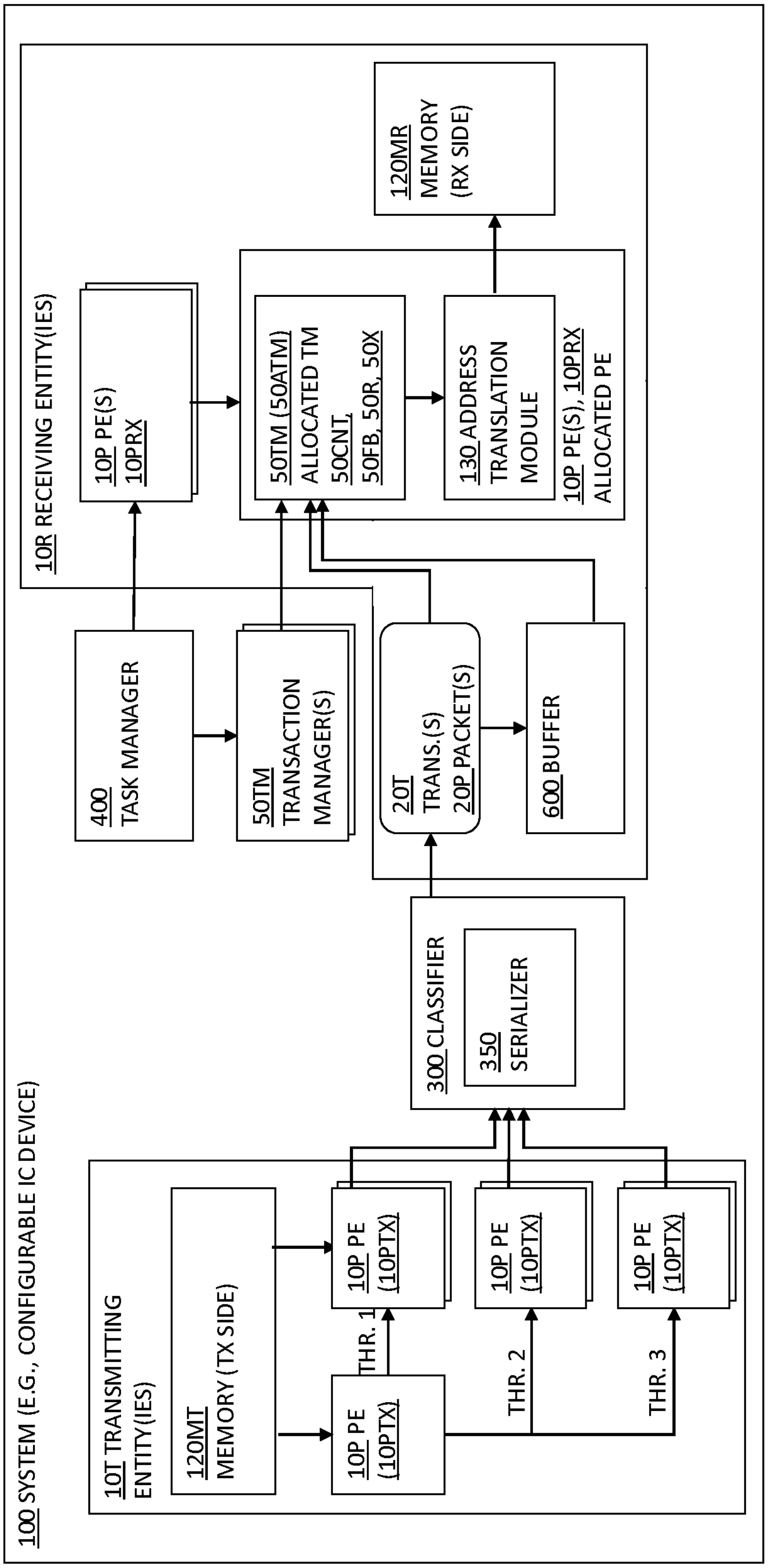
FIG. 3 is a block diagram depicting an example of implementation of a system (e.g., a reconfigurable Integrated circuit device), adapted to manage data transactions over a direct memory access protocol, according to some embodiments of the invention.

As shown in the diagram, packets 1-3 may initially arrive out of order, and may be handled by a transaction manager (e.g., which may write, or store them into appropriate, corresponding target addresses in the receiver memory at the order of arrival). As shown in FIG. 3, by doing so, a transaction manager may facilitate out-of-order packet offloading, in real-time or near-real time.

Additionally, the transaction manager of the present invention may employ a counter, adapted to keep track of a number of incoming packets 20P of each transaction. When the number of received, and stored packets 20P matches the number of expected packets as dictated by the header of the first packet (SN=0, in this case: 4), then the transaction manager 50™ of the present invention may determine that the respective transaction (TRANS1) was transferred and handled successfully, and produce appropriate indications thereto.

As shown in FIG. 2A, following the processing of the first transaction (TRANS1), a second transaction (TRANS2) may be received. TRANS2 may consist of a single packet SN=0. In some implementations, when a data transaction 20T consists of only a single packet 20P, that packet 20P may contain a redundant header structure. This single packet 20P, serving as both the first and last packet of the transaction, may include the special header typically associated with the first packet of a multi-packet transaction. Additionally, the header may also include an end-of-transaction indicator typically found in the last packet of a multi-packet transaction. The single packet 20P transaction 20T may be written into an appropriate address in the received memory upon arrival, and the transaction may be promptly terminated following this action.

The diagram of FIG. 2A further shows a third transaction (TRANS3). The first packet header of TRANS3 may define TRANS3 to include four packets: SN=0 through SN=3. In this example, the third transaction packet 20P (TRANS3, SN=2) has failed to arrive, before a packet from a subsequent transaction (fourth transaction 20T, sequence number zero TRANS4, SN=0) was received.

In this scenario, a counter of the transaction manager 50TM of the present invention may identify lack of sufficient received packets 20P, and may produce an appropriate indication or message thereof. For example, transaction manager 50TM may send a retransmission message to the relevant transmitting entity (TX entity 3), to restart transmission of faulty transaction 3.

This scenario demonstrates how the transaction manager 50TM of the present invention may handle disorder of packets 20P across different transactions 20T.

At the bottom of FIG. 2A, the received transactions 20T converge into ordered sequences within the target memory of the receiving entity. This visualization effectively demonstrates how the transaction manager may obtain a data transaction comprising a series of data packets via the memory access protocol, where the data transaction originates from at least one transmitting entity and targets a memory element of a specific receiving entity. The real-time writing of packets into their respective target addresses, as shown in the diagram, allows for efficient handling of out-of-order packets over DMA protocols. This approach may enable the system to process packets as they arrive, regardless of their sequence numbers, potentially reducing latency and minimizing hardware overhead.

Figure 2B:
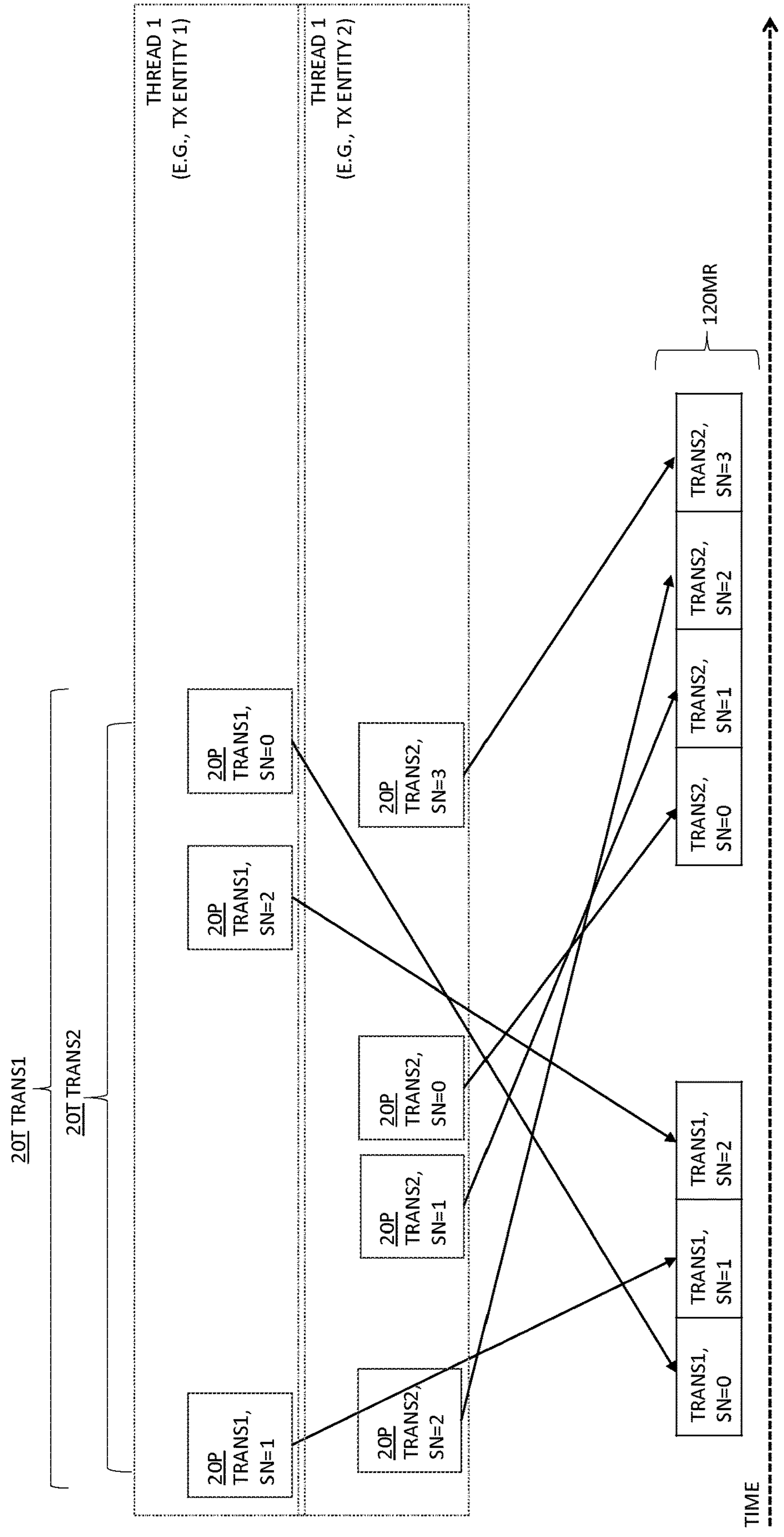
FIG. 2B is a timeline diagram illustrating another example of real-time offloading of packet reordering in a direct memory access protocol, according to some embodiments of the invention.

FIG. 2B illustrates a timeline diagram showing another example for implementing real-time offloading of packet reordering in a DMA or RDMA protocol, as may be implemented by embodiments of the invention.

Similar to FIG. 2A, the diagram in FIG. 2B also shows processing of multiple transactions, each consisting of one or more packets, by embodiments of the invention. Here too, a connection is defined between at least one specific one transmitting entity (TX entity 1, TX entity 2) and a specific receiving entity.

Unlike the example of FIG. 2A, in FIG. 2B, the connections between transmitting entities (entities 1-3) and the receiving entity may all pertain to the same processing thread (Thread 1). As shown in FIG. 2B, a first transaction 20T (TRANS1) that consists of three packets 20P (denoted by respective sequence numbers SN=0 through SN=2) may commence, and may be intermitted by packets of a second transaction 20T (TRANS2).

As explained above in relation to of FIG. 2A, where packets pertaining to different transactions also correspond to different threads, embodiments of the invention may trigger retransmission of transactions when packets from different threads are received intermittently. In the example of FIG. 2B, where packets pertaining to different transactions correspond to the same thread, embodiments of the invention may refrain from initiating retransmission, and may store the received packets in their proper physical addresses, thereby reordering packets of one or more transactions substantially upon their arrival.

FIG. 3 is a block diagram depicting an example of implementation of a system 100 for handling direct memory access transactions, according to some embodiments of the invention. In the example of FIG. 3, system 100 may be implemented as a reconfigurable Integrated Circuit (IC) device 100, adapted to manage data transfer over an on-chip, direct memory access protocol. In this context, the terms "system 100" and "device 100" may be used herein interchangeably.

In the example of FIG. 3, reconfigurable device 100 may include one or more transmitting entities 10T, and one or more receiving entities 10R. Reconfigurable device 100 may be dynamically reconfigured to allocate Processing Elements (PEs) for specific tasks. For example, a group of one or more first PEs 10PTX may be dynamically configured to process incoming data to implement a first portion of a task or a logic function. These configured first processing elements 10PTX may then send the processed data to a second group, consisting of at least one second processing element 10PRX. In this configuration, the first group of Pes 10PTX may be considered as one or more respective, on-chip transmitting entities 10T, whereas the second group of at least one second processing element 10PRX may be viewed as respective on-chip receiving entities 10R.

In the example of FIG. 3, the first logic may be parallelized to produce one or more (e.g., multiple) parallel threads (THR. 1-3). Each thread may be implemented by a respective group of PEs. For instance, Thread 1 may be implemented by a first group of PEs 10PTX, Thread 2 by a second group of PEs 10PTX, and Thread 3 by a third group of PEs 10PTX. In this configuration, each thread of PEs 10PTX may be considered a separate transmitting entity 10T.

This parallelization allows for concurrent processing of different aspects or portions of the incoming data. Each thread may operate independently, processing its assigned data subset in parallel with the other threads. As a result, the overall processing throughput may be increased, potentially reducing the total processing time for complex tasks.

The parallel nature of this configuration may lead to scenarios where data packets from different threads (THR. 1-3) are produced and transmitted at varying rates. Consequently, packets from these parallel transmitting entities 10T may arrive at the receiving entity 10R in an order that differs from their logical or sequential order. This out-of-order arrival of packets from multiple parallel threads underscores the importance of an efficient, on-the-fly packet reordering mechanism, as elaborated herein.

According to some embodiments, one or more (e.g., each) transmitting entity 10T may include, or may be associated with, a memory element or device, denoted herein as "transmitter memory 120MT". In a complementary manner, one or more (e.g., each) receiving entity 10R may include, or may be associated with, a memory element or device, denoted herein as a "receiver memory 120MR".

Reconfigurable device 100 may build upon a direct memory access protocol to transmit data from one or more transmitter memory 120MT of the transmitting side, directly to at least one receiver memory 120MR of the receiving side.

For example, memory element 120MT of the transmitting entity 10T and memory element 120MR of the receiving entity 10R may both be Random Access Memory (RAM) elements. This configuration may be useful in applications where large amounts of data need to be transferred between different parts of a system or between separate systems.

For example, in high-performance computing or big data processing, where massive datasets are distributed across multiple nodes, such RAM-to-RAM transfer allows for efficient movement of data chunks between processing units of 10T and 10R. This configuration may enable parallel processing and load balancing by facilitating rapid redistribution of data as computational needs change, without the overhead of involving a main CPU or GPU in the transfer process.

In another example, memory element 120MT of the transmitting entity 10T may be a RAM element, while the memory element 120MR of the receiving entity 10R may be a cache memory element associated with processing elements 10PRX of receiving entity 10R. This RAM-to-cache configuration may be advantageous in scenarios where processed data needs to be quickly accessed by a specific processing element.

For instance, in real-time data analytics or high-frequency trading systems, where rapid decision-making is crucial, this setup may allow efficient processing of data stored in RAM by the transmitting entity's processing elements 10PTX, followed by direct transmission of the processed results into the receiving processing element's cache on the receiving entity 10R side. By bypassing the main memory and placing data directly into the cache, this approach may significantly reduce data access latency, while minimizing consumption of CPU or GPU processing cycles.

As explained herein, each data thread (THR. 1, THR. 2, THR. 3) of the multiple parallel data threads may serve as a separate transmitting entity, generating respective data packets 20P for the data transaction 20T. Due to the parallel processing of data threads THR. 1, THR. 2, THR. 3, they may produce two or more data packets 20P that are out of order, e.g., when a serial number of a first data packet 20P, in a first thread exceeds that of a subsequent data packet 20P in a second thread. Reconfigurable device 100 may be configured to write or store each data packet 20P at its appropriate target memory address in real time, substantially at the time, and order of that packet's arrival, to facilitate out-of-order packet offloading.

As shown in FIG. 2A, data packets that originate from different transmitting entities 10T (e.g., different threads) may be emitted concurrently (e.g., overlapping in time) by entities 10T (e.g., packet SN=2 and SN=3 of Thread 1 in FIG. 2A). As shown in FIG. 3, system (e.g., reconfigurable IC device) 100 may include a serializer module module 350. In some cases, packets 20P from processing elements 10PTX that pertain to a specific transaction 20T, and are directed to a common receiving entity 10R may be introduced to the serializer module 350. Serializer module 350 may produce a serial stream (also denoted herein as a "series") of packets 20P. The term "serial" may be used in this context to indicate that no two packets overlap in time, e.g., transmitted over a single, dedicated, half-duplex on-chip wire.

According to some embodiments, system (e.g., IC device) 100 may include at least one task manager module 400, and one or more (e.g., a plurality of) hardware-implemented transaction manager modules 50TM. One or more (e.g. each) transaction manager 50TM may be allocated by task manager module 400 to manage a unique connection between at least one specific transmitting entity 10T and a specific receiving entity 10R of the one or more receiving entities 10R.

As explained herein, task manager 400 may be configured to temporarily allocate a specific transaction manager 50TM of the one or more transaction manager 50TM to handle a connection of a specific transaction 20T, consisting of a series of packets 20P, between at least one transmitting entity 10T and a specific receiving entity 10R. In other words, transaction manager 50TM may be allocated to serve an ad-hoc connection, to facilitate data communication, and on-the-fly packet reordering between the at least one transmitting entity and the specific receiving entity.

Task manager 400 may control allocation of (e.g., dynamically deallocate and reallocate) transaction managers 50TM to efficiently manage multiple connections. For example, when a transaction 20T is completed, task manager 400 may deallocate the associated transaction manager 50TM, freeing it for use with other connections. Subsequently, the task manager 400 may reallocate this or another available transaction manager 50TM to handle a new ad-hoc connection for transaction 20T. This flexible allocation strategy may allow system 100 to efficiently utilize resources, potentially handling a larger number of concurrent connections than the total number of transaction managers 50TM available on reconfigurable IC device 100.

According to some embodiments, each transaction manager may be allocatable to handle a unique connection between at least one specific transmitting entity and a specific receiving entity of the one or more receiving entities.

Reconfigurable device 100 may further include a packet classification module (also referred to as classifier) 300. Classifier 300 may be adapted to receive the series of packets 20P pertaining to one or more connections as input, classify the incoming packets 20P to identify the connection associated with each packet, and route each packet to the transaction manager 50TM allocated for the identified connection 50TM.

Classifier 300 may employ various criteria to classify incoming packets 20P and determine their appropriate routing. For instance, classification may be based on identifiers of threads, allowing packets from specific threads to be directed to designated transaction managers. The classifier may also categorize packets based on their type, such as data packets, control packets, or acknowledgment packets, enabling specialized handling for each type. Additionally, classification may consider the process or application that the packets pertain to, facilitating process-specific routing and management. Other potential classification criteria may include packet priority levels, destination addresses, quality of service requirements, specific transaction identifiers embedded in the packet headers, and the like.

System (e.g., reconfigurable IC device) 100 may optionally route packets 20P to the allocated transaction manager 50TM of receiving entities 10R via a buffer 600. Buffer 600 can be designed to be small, capable of storing only a limited number of packets 20P, such as a single packet. The inclusion of this buffer may serve to synchronize the incoming data stream with the receiving entities 10R, ensuring smooth data flow without causing packet drops. By limiting the buffer size, system 100 may maintain efficient operation while minimizing hardware resource overhead. This approach facilitates proper timing and synchronization between transmitting 10T and receiving entities 10R, while avoiding the complexity and resource consumption associated with larger buffer or First-In-First-Out (FIFO) implementations.

Transaction manager 50TM of receiving entity 10R may obtain a data transaction 20T, which may include a series of data packets, via the direct memory access protocol, as explained herein (e.g., in FIG. 2A). The received data transaction 20T may originate from at least one transmitting entity 10T, and may target a memory element 120MR of a specific receiving entity 10R.

Receiving entity 10R may include one or more receiving processing elements 10PRX that may be required to process the received data packets 20P of data transaction 20T. In some embodiments, transaction manager 50TM (e.g., processing elements 10PRX) of the receiving entity 10R may implement, or may be associated with an address translation module 130. Address translation module 130 may be configured to interface with the receiver memory 120MR on the entity 10R, and translate virtual memory addresses, included in packets 20P, to corresponding physical addresses on the receiver memory 120MR.

In some embodiments, address translation module 130 of PE 10PRX may function as a Memory Management Unit (MMU), to map virtual addresses contained in packets 20P to corresponding physical target addresses in the receiver memory 120MR.

For example, when a packet 20P arrives at the receiving entity 10R, it may contain a virtual address indicating where its data should be stored. The address translation module 130 may then translate this virtual address to a specific physical address in the RAM 120MR. This translation process may involve consulting a page table or other mapping structure to determine the appropriate physical memory location. Translation module 130 may thus enable efficient memory management and provide a layer of abstraction between the logical or virtual addresses used by transmitting entities 10T and actual physical memory layout of the receiving entity 10R.

In some embodiments, address translation module 130 of transaction manager 50TM may be configured to calculate target addresses in target memory element 120MR, for one or more (e.g., each) data packet 20P of the received transaction 20T, based on sequence numbers of data packets 20P.

For example, a first packet in transaction 20T may include definition of a virtual base address, and packet sizes. Transaction manager 50TM may translate the virtual base address to a physical block start address in the target memory element 120MR. Additionally, for each packet 20P in the transaction 20T, the transaction manager 50TM may use the packet's sequence number to calculate a physical address offset from the block start address. This offset may be determined by multiplying the sequence number by the defined packet size. The final target address for each packet 20P may then be computed by adding the calculated offset to the physical block start address.

Transaction manager 50TM may subsequently write data packets 20P of the received transaction 20T into their corresponding, calculated target addresses at the time and/or order of arrival.

For example, the series of packets may include one or more data packets that are placed out of order, as in the example of transaction 1 in FIG. 2A. The allocated transaction manager 50TM may be configured to write the data packets 20P of the data transaction 20T into their corresponding, calculated target addresses in memory 120MR, substantially upon their arrival (e.g., writing SN=2 before writing SN=1). Transaction manager 50TM may thereby facilitate out-of-order packet offloading, allowing PEs of receiving entity 10R to process packet transactions 20T upon arrival. It may be appreciated that this approach may streamline data transmission and processing, without consuming computational resources (e.g., CPU processing cycles, or storage space) for transferring or reordering incoming data transactions 20T.

Upon writing all expected packets of the transaction 20T, the allocated transaction manager 50TM may generate a feedback signal 50FB that includes a completion indication or acknowledgement. Feedback signal 50FB may be sent to the transmitting entity 10T to confirm successful receipt and storage of the entire transaction 20T.

Additionally, or alternatively, feedback signal 50FB may be sent to one or more PEs 10PRX, associated with, or included in receiving entity 10R, indicating that storage of transaction 20T was in memory 120MR has been completed, and that processing of that data may commence.

Additionally, or alternatively, feedback signal 50FB may be sent to one or more task manager modules 400, that may decide to deallocate, or reallocate transaction manager(s) 50TM for serving specific connections.

Figure 1:
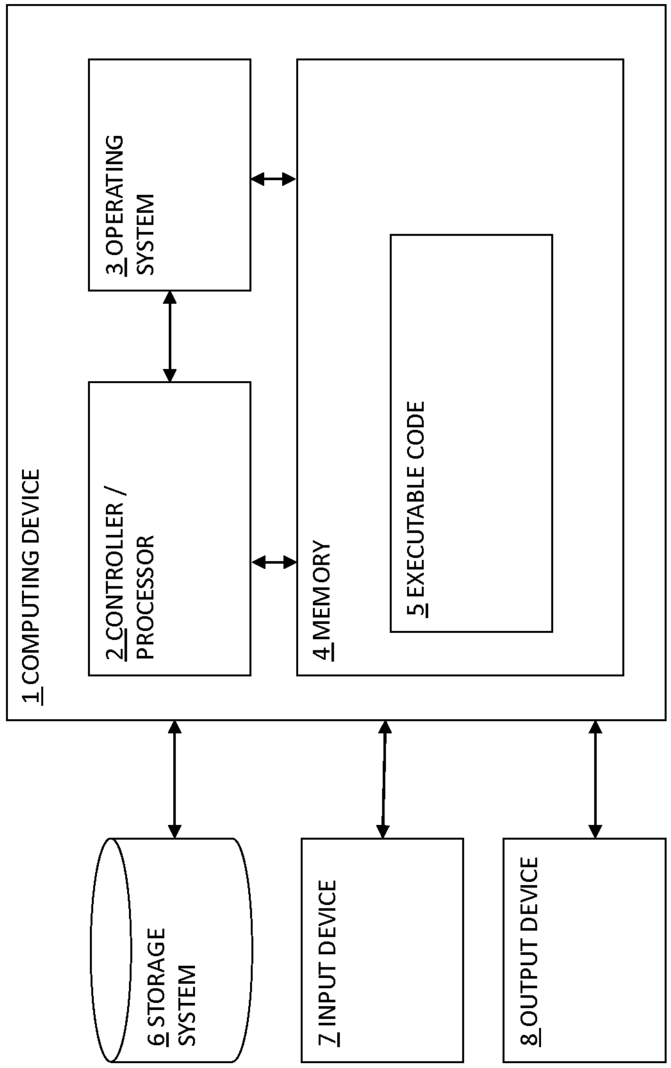
FIG. 1 is a block diagram, depicting a computing device which may be included in a system for real-time offloading of packet reordering in a direct memory access protocol, according to some embodiments of the invention.

According to some embodiments, system (e.g., reconfigurable device) 100 may include, or may be associated with a controller or processor (e.g., CPU, GPU, and the like) such as controller 2 of FIG. 1. Controller 2 may be configured to receive feedback signal 50FB (e.g., as an interrupt), or monitor feedback signal 50FB (e.g., by a polling mechanism), to detect and mitigate various conditions of failure.

For example, controller 2 may identify a condition such as that provided in FIG. 2A, in relation to transaction 3. In that example, transaction 3 was not finalized (completion signal 50 was not received) before a first packet (SN=0) of new transaction 4 was received. In such a condition, controller 2 may communicate feedback signal 50FB to transmitting entities 10T as a retransmission message, to issue retransmission of transaction 3.

In another example, controller 2 may identify a condition in which a number of received packets 20P matches an expected number of packets in transaction 20T, but nevertheless a gap occurs in sequence numbers of received packets 20P due to packet duplication. Upon detection of this condition, controller 2 may issue a retransmission request, requiring retransmission of data transaction 20T by at least one specific transmitting entity 10T.

According to some embodiments, each transaction manager 50TM may be dynamically allocated, and dedicated by task manager 400 to serve a unique connection. That unique connection may represent a logical communication link for data transfer between one or more specific transmitting entities 10T (e.g., a single transmitting entity) and at least one specific receiving entity 10R. Allocated transaction manager 50TM may maintain a transaction metadata 50X.

Transaction metadata 50X may include one or more definitions, or metadata pertaining to that transaction manager's 50TM unique connection, e.g., representing transaction(s) 20T between the one or more specific transmitting entities 10T and the at least one specific receiving entity 10R.

For example, each packet 20P may include metadata information 50X indicating whether it is a start, middle, or end of a transaction 20T. Transaction manager 50TM may implement a state machine workflow, transitioning between initial, middle, and terminal states based on this metadata. The workflow moves from the initial state, expecting the first packet 20P of transaction 20T, through a middle state, processing subsequent packets 20P, to a terminal state, completing the transaction 20T, having written all expected packets into memory element 120MR. Transaction metadata 50X maintained by the transaction manager 50TM may include the current state of this state machine, enabling efficient management of packet transactions.

In another example, metadata 50X may maintain transaction-specific 20T parameters, including for example, a base memory address of a transaction 20T for writing packets 20P, packet 20P size(s), a number of expected packets 20P and/or range of expected data packet sequence numbers, and the like.

Allocated transaction manager 50TM may utilize metadata 50X to handle corresponding, unique transactions 20T.

For example, allocated transaction manager 50TM may calculate memory address offsets for writing packet payloads. Allocated transaction manager 50TM may then use the packet's sequence number to calculate a physical address offset from the base memory address stored in the transaction metadata 50X. This offset may be determined by multiplying the sequence number by the defined packet size.

According to some embodiments, allocated transaction manager 50TM may include a counter 50CNT, adapted to count incoming and/or written packets 20P. In some implementations, counter 50CNT may be initialized based on transaction length information included in a first packet of a transaction 20T. For example, the first packet may contain a header specifying the total number of expected packets in the transaction, and counter 50CNT may be set to this value. As each packet 20P arrives and is written to memory 120MR, counter 50CNT may decrement, effectively counting down towards zero. This approach may allow transaction manager 50TM to efficiently track progress and determine when all expected packets have been received.

Additionally, or alternatively, counter 50CNT may be configured to count up from zero, incrementing with each received packet until it reaches the expected total. After completion of a transaction 20T, counter 50CNT may be reset to its initial state (e.g., zero or the expected number of packets for the next transaction) in preparation for handling subsequent transactions. This reset operation may occur automatically upon transaction completion or may be triggered by a signal e.g., from task manager 400 or controller 2.

Additionally, or alternatively, allocated transaction manager 50TM may compare the number of expected packets 20P, as dictated by transaction metadata 50X, to the number of written packets, indicated by counter value 50CNT. Allocated transaction manager 50TM may determine that writing of an expected number of packets 20P into their respective target addresses has been completed based on this comparison, and generate feedback signal 50FB (e.g., a packet completion indication, signifying that all packets 20P have been written into memory 120MR). Allocated transaction manager 50TM may subsequently signal feedback 50FB (e.g., completion acknowledgement) to a relevant transmitting entity 10T of the dedicated connection. This completion acknowledgement may indicate successful receipt and storage of the entire transaction 20T.

In another example, task manager 400 may utilize metadata 50X to identify communication faults. For example, allocated transaction manager 50TM may open a new window for a next transaction 20T only when all packets 20P of a current transaction 20T are received and offloaded. This approach may ensure that transactions 20T are processed completely before moving on to the next transaction 20T, thereby mitigating issues of missing packets 20P, as explained in the example Transaction 3 of FIG. 2A.

In yet another example, allocated transaction manager 50TM may utilize metadata 50X to control system-level resource allocation. For example, task manager 400 may be configured to reallocate, or deallocate transaction manager 50TM from serving the specific, dedicated connection upon completion of writing the expected number of packets 20P. This deallocation may allow the task manager 400 to efficiently manage system resources by freeing up the allocated transaction manager 50TM for use with other connections or transactions.

As explained herein, system 100 may be implemented by a reconfigurable device 100 that may include a plurality of reconfigurable PEs 10P (e.g., 10PTX, 10PRX). Task manager 400 may be configured to receive (e.g., via input device 7 of FIG. 1) a definition of a processing task, and divide the processing task into a plurality of segments. Task manager 400 may then allocate a first group of PEs to perform a first segment of the task, and a second group of PEs to perform a second, subsequent segment of the task. Task manager 400 may further define, or allocate a direct memory access connection, facilitating communication of data transactions between the first group (as one or more transmitting entities 10T), and the second group (as at least one receiving entity 10R).

As also described herein, task manager 400 may further divide the processing task into a plurality of parallel data threads by (a) allocating unique subsets of the first group of PEs to implement each data thread on the transmitting side, and (b) allocating unique subsets of the second group of PEs to implement each data thread on the receiving side. Task manager 400 may thereby define each data thread of the first group of PEs (on the transmitting side) as a separate transmitting entity (generating respective data packets 20P for data transaction 20T), and define each data thread of the second group of PEs (on the receiving side) as a separate receiving entity 10R (receiving packets 20P of data transaction 20T).

Task manager 400 may subsequently allocate at least one ad-hoc transaction manager, to perform on-the-fly packet reordering of said data transactions between one or more transmitting entities 10T and receiving entities 10R.

Figure 4:
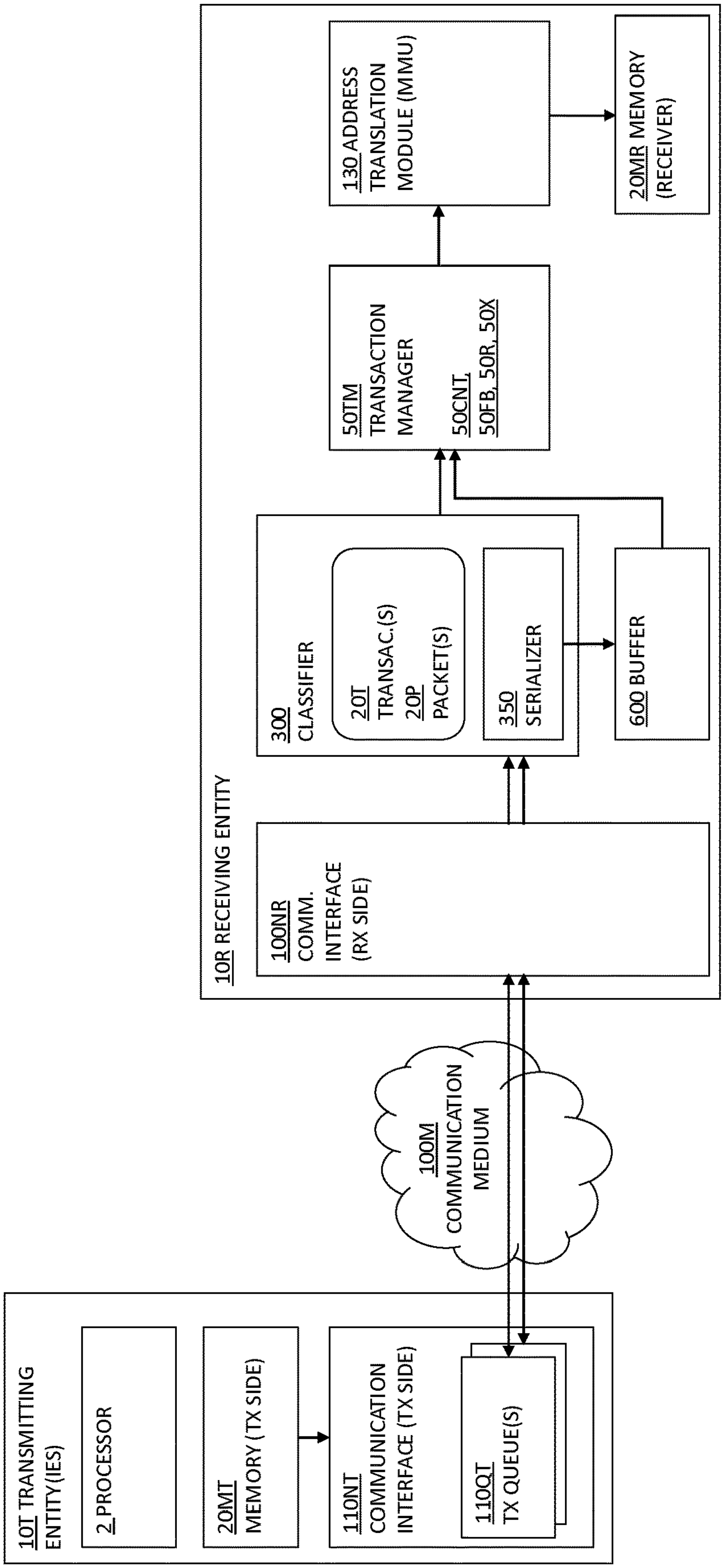
FIG. 4 is a block diagram showing another example of implementation of a system for managing data transactions over a direct memory access protocol, according to some embodiments of the invention.

FIG. 4 is a block diagram showing another example of implementation of a communication system that can be utilized for managing data transactions, according to some embodiments of the invention.

In contrast to FIG. 3, where system 100 may be a single device, such as a configurable, Integrated Circuit (IC) device, system 100 in the example of FIG. 4 is divided into at least one transmitting entity 10T (e.g., one IC), and at least one receiving entity 10R (e.g., another IC).

The transmitting entity/entities 10T and receiving entity/entities 10R of system 100 may be connected by a communication medium (100M) via a transmitter communication interface (110NT) (e.g., one NIC), with a transmitter queue (110QT) on the transmitter side 10T, and a receiver communication interface (110NR), (e.g., another NIC) on the receiver side 10R.

Other components of FIG. 4 are similar to their counterparts in FIG. 3, including the receiver memory 20MR, transmitter memory 20MT, classifier 300, serializer 350, buffer 600, transaction manager 50TM, and address translation module 130, and their description will not be repeated here for the sake of brevity.

This implementation demonstrates how system 100 can be adapted for communication between separate devices or ICs, while maintaining the core functionality for managing data transactions and packet processing, as elaborated herein.

Figure 5:
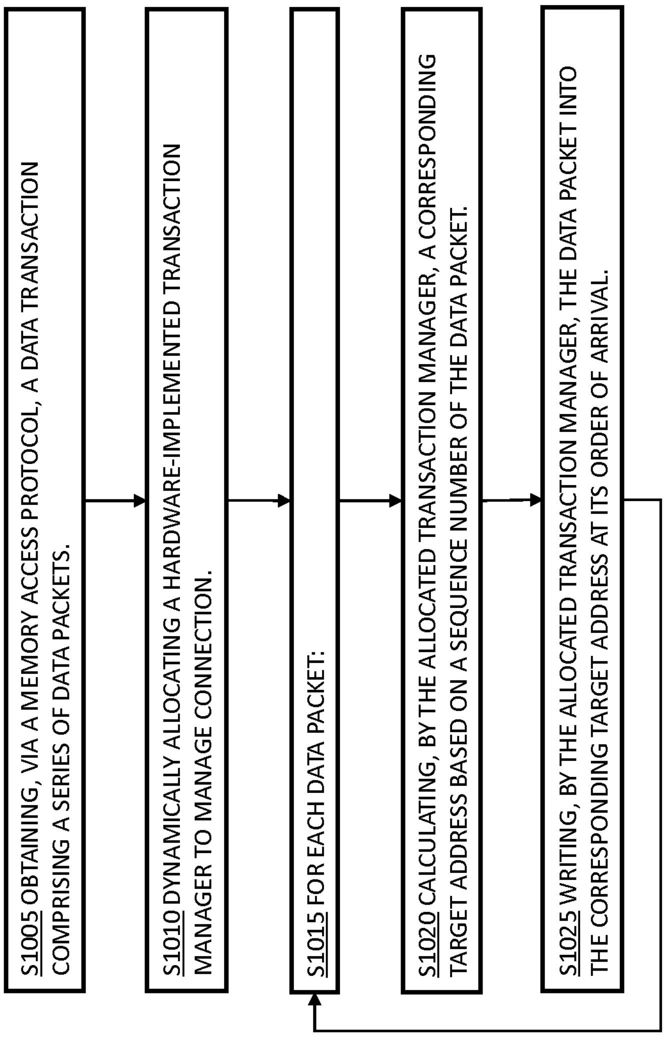
FIG. 5 is a flow diagram showing an example of a method of managing data transactions over a direct memory access protocol, according to some embodiments of the invention.

FIG. 5 is a flow diagram, depicting a method for managing data transactions, which may be implemented by system 100, according to some embodiments of the invention.

According to some embodiments, at step S1005 system 100 may obtain a data transaction (e.g., 20T of FIGS. 2-4) comprising a series of data packets (e.g., 20T of FIGS. 2-4) via a memory access protocol connection. Data transaction 20T may originate from at least one transmitting entity (e.g., 10T of FIGS. 3-4) and target a memory element (e.g., 120MR of FIGS. 3-4) of a specific receiving entity (e.g., 10R FIGS. 3-4).

At step S1010, embodiments of the method may include allocating a hardware-implemented transaction manager (e.g., 50TM of FIGS. 3-4) to handle, or manage the connection between the at least one transmitting entity 10T and the specific receiving entity 10R. This allocation may be performed ad-hoc, by the task manager 400 shown in FIG. 3.

Embodiments of the method may then enter a loop at step S1015 for processing each data packet 20P of the series. Within this loop, step S1020 involves calculating, by the allocated transaction manager 50TM, a corresponding target address in the target memory element 120MR, e.g., based on a sequence number of the data packet 20P. This calculation may utilize an address translation module (e.g., address translation module 130 of FIG. 3), included in, or associated with the allocated transaction manager 50TM in receiving entity 10R.

Following the address calculation, at step S1025, the allocated transaction manager 50TM may write the data packet 20P into the corresponding target address in memory 120MR at its order of arrival (e.g., substantially at the time of its arrival), thereby offloading on-the-fly packet reordering. This process may allow processing elements 10PRX of the receiving entity 10R to access and process packet transactions 20T upon arrival, without waiting for reordering.

Embodiments of the method may then return to step S1015 to process the next data packet 20P in the series of packet transaction 20T, continuing until all packets have been processed. This loop structure enables the handling of multiple data packets 20P within a single transaction 20T.

After processing all packets, the transaction manager 50TM may generate a completion indication, which may be communicated to the transmitting entity 10T and/or to the processing elements 10PRX of the receiving entity 10R, notifying them of the completed transaction.

The invention claimed is:

1. A system for managing data transfer via a direct memory access protocol, the system comprising:
- one or more receiving entities, each associated with at least one respective memory element; and
- one or more hardware-implemented transaction managers, wherein at least one transaction manager of the one or more transaction managers is configured to serve a specific, ad-hoc connection between at least one transmitting entity and a specific receiving entity of the one or more receiving entities by:
- obtaining a data transaction, comprising a series of data packets, via the memory access protocol, wherein said data transaction (a) originates from the at least one transmitting entity, and (b) targets a memory element of the specific receiving entity;
- for each data packet, (i) calculating a corresponding target address in the target memory element based on a sequence number of the data packet, and (ii) writing the data packet into the corresponding target address at its order of arrival, thereby facilitating out-of-order packet offloading, wherein the system further comprises a plurality of configurable processing elements, and wherein the task manager is further configured to:
- receive a processing task;
- divide the processing task into a plurality of parallel data threads; and
- allocate unique groups of the plurality of processing elements to implement each data thread, wherein each data thread serves as a separate transmitting entity, generating respective data packets for the data transaction.

2. The system of claim 1, wherein said series comprises one or more data packet that are placed out of order, and wherein the transaction manager is configured to write the data packets of the data transaction into their corresponding, calculated target addresses substantially upon their arrival.

3. The system of claim 1, further comprising at least one task manager configured to temporarily allocate a specific transaction manager of the one or more transaction managers, to serve the ad-hoc connection, thereby facilitating data communication between the at least one transmitting entity and the specific receiving entity.

4. The system of claim 3, wherein each transaction manager is allocatable to manage a unique connection between at least one specific transmitting entity and a specific receiving entity of the one or more receiving entities, and wherein the system further comprises a packet classification module configured to:
- receive incoming packets pertaining to one or more connections;
- identify the connection associated with each packet; and
- route each packet to the transaction manager allocated for the identified connection.

5. The system of claim 1, wherein the at least one transaction manager is further configured to maintain a transaction metadata data element, comprising a current state of the data transaction, a base memory address for writing received packets, and a range of expected data packet sequence numbers.

6. The system of claim 5, wherein the at least one transaction manager is further configured to:
- determine that writing of an expected number of packets into their respective target addresses has been completed, based on said transaction metadata; and
- signal a completion acknowledgement to the transmitting entity upon said completion.

7. The system of claim 3, wherein the at least one transaction manager is further configured to determine that writing of an expected number of packets into their respective target addresses has been completed, and wherein the at least one task manager is configured to deallocate the transaction manager from serving the specific connection upon said completion.

8. The system of claim 1, wherein the data packets generated from two or more data threads potentially arrive at the transaction manager out of order, and wherein the transaction manager is further configured to:
- receive the potentially out-of-order data packets from the two or more data threads;
- calculate target addresses for each received data packet based on their respective sequence numbers; and
- write the data packets to their calculated target addresses in the order of arrival, thereby facilitating out-of-order packet offloading originating from the two or more data threads.

9. The system of claim 1, wherein the data transaction comprises potentially concurrent data packets, originating from two or more transmitting entities, and wherein the system further comprises a serialization module, adapted to:
- receive said data transaction; and
- serialize the potentially concurrent data packets, to produce said series of data packets.

10. The system of claim 1, further comprising a controller configured to:
- detect a condition in which (i) a number of received packets matches an expected number of packets, but (ii) a gap occurs in sequence numbers of received packets due to packet duplication; and upon said detection, issue a retransmission request for the data transaction to the at least one specific transmitting entity.

11. A reconfigurable Integrated Circuit (IC) device comprising a plurality of Processing Elements (PEs), one or more hardware-implemented transaction managers and a task manager, wherein the task manager is configured to:

receive a processing task;

allocate a first group of PEs to perform a first segment of the task;

allocate a second group of PEs to perform a second segment of the task based on output of the first group of PEs;

define a direct memory access connection, facilitating communication of data transactions between the first group, as one or more transmitting entities, and a memory element pertaining to the second group, as a receiving entity; and allocate a transaction manager of the one or more transaction managers as an ad-hoc handler of the direct memory access connection, wherein the transaction manager is configured to perform on-the-fly packet reordering of out-of-order packets in said data transactions, wherein the task manager is further configured to:

divide the processing task into a plurality of parallel data threads;

allocate unique subsets of the first group of PEs to implement each data thread; and defining each data thread as a separate transmitting entity, generating respective data packets for the data transaction.

12. The IC device of claim 11, wherein the allocated transaction manager is configured to:

obtain a data transaction, comprising a series of data packets, via the direct memory access connection, wherein said data transaction originates from the one or more transmitting entities, and targets a memory element of a specific receiving entity;

for each data packet, (i) calculate a corresponding target address in the target memory element, and (ii) write the data packet into the corresponding target address, substantially at its time of arrival, thereby facilitating out-of-order packet offloading.

13. A method of managing data transfer, the method comprising:

obtaining, via a memory access protocol, a data transaction comprising a series of data packets, wherein said data transaction originates from at least one transmitting entity and targets a memory element of a specific receiving entity, and wherein one or more data packet are placed out of order;

allocating a hardware-implemented transaction manager as an ad-hoc handler, to manage connection between the at least one transmitting entity and the specific receiving entity;

for each data packet of the series:

calculating, by the allocated transaction manager, a corresponding target address in the target memory element based on a sequence number of the data packet; and writing, by the allocated transaction manager, the data packet into the corresponding target address at its order of arrival, thereby facilitating out-of-order packet offloading, wherein the allocated transaction manager is configured to maintain a transaction metadata data element, comprising a current state of the data transaction, a base memory address for writing received packets, and a range of expected data packet sequence numbers, and wherein the method further comprises:

determining, by the allocated transaction manager, that writing of an expected number of packets into their respective target addresses has been completed, based on said transaction metadata; and signaling a completion acknowledgement to the transmitting entity upon said completion.

14. The method of claim 13 further comprising:

determining, by the allocated transaction manager, that writing of an expected number of packets into their respective target addresses has been completed; and deallocating the transaction manager from serving the said connection, upon said completion.

15. The method of claim 13, further comprising:

receiving, by a task manager module, a processing task, and dividing the processing task into a plurality of parallel data threads; and allocating unique groups of processing elements (PEs) from a plurality of Pes to implement each data thread, by the task manager, wherein each data thread serves as a separate transmitting entity, generating respective data packets for the data transaction.

16. The method of claim 15, wherein the data packets generated from two or more data threads potentially arrive at the allocated transaction manager out of order, and wherein the method further comprises:

receiving the potentially out-of-order data packets from the two or more data threads;

calculating target addresses for each received data packet based on their respective sequence numbers; and writing the data packets to their calculated target addresses in the order of arrival, thereby facilitating out-of-order packet offloading originating from the two or more data threads.

* * * * *